US010108147B2

(12) United States Patent
Inoue et al.

(10) Patent No.: US 10,108,147 B2
(45) Date of Patent: Oct. 23, 2018

(54) IMAGE PHOTOGRAPHY METHOD, IMAGE PHOTOGRAPHY PLAY METHOD, SPATIAL LIGHTING MODULATOR, IMAGE PLAY DEVICE, AND DIGITAL HOLOGRAM FORMING DEVICE

(75) Inventors: Mitsuteru Inoue, Toyohashi (JP); Hiroyuki Takagi, Toyohashi (JP)

(73) Assignee: NATIONAL UNIVERSITY CORPORATION TOYOHASHI UNIVERSITY OF TECHNOLOGY, Aichi (JP)

( * ) Notice: Subject to any disclaimer, the term of this patent is extended or adjusted under 35 U.S.C. 154(b) by 866 days.

(21) Appl. No.: 14/122,188

(22) PCT Filed: May 31, 2012

(86) PCT No.: PCT/JP2012/064095
§ 371 (c)(1),
(2), (4) Date: Nov. 25, 2013

(87) PCT Pub. No.: WO2012/165556
PCT Pub. Date: Dec. 6, 2012

(65) Prior Publication Data
US 2014/0253986 A1 Sep. 11, 2014

(30) Foreign Application Priority Data

May 31, 2011 (JP) ................................ 2011-122854

(51) Int. Cl.
*G03H 1/08* (2006.01)
*G03H 1/26* (2006.01)
(Continued)

(52) U.S. Cl.
CPC ............. *G03H 1/268* (2013.01); *G02B 27/26* (2013.01); *G02F 1/09* (2013.01); *G03H 1/02* (2013.01);
(Continued)

(58) Field of Classification Search
CPC .... G03H 1/0866; G03H 1/268; G03H 1/2294; G03H 1/0248; G03H 1/0891; G03H 1/02;
(Continued)

(56) References Cited

U.S. PATENT DOCUMENTS 5,272,690 A 12/1993 Bargerhuff et al.
2011/0172127 A1* 7/2011 Jacobson ........... C12N 15/1093
506/26

FOREIGN PATENT DOCUMENTS

EP 559435 9/1993
JP 03-150534 A 6/1991
(Continued)

OTHER PUBLICATIONS

Aoshima et al (Submicron Magneto-Optical Spatial Light Modulation Device for Holographic Displays driven by Spin-polarized Electrons, J. Display Tech., vol. 6, No. 9, Sep. 2010, pp. 374-379).*
(Continued)

*Primary Examiner* — Stephone B Allen
*Assistant Examiner* — Jyotsna Dabbi
(74) *Attorney, Agent, or Firm* — Yakov S. Sidorin; Quarles & Brady LLP

(57) ABSTRACT

An image photography play method which is suited to playing a stereoscopic video. The image photography method includes: a step of forming a hologram pattern from a reference light and a subject light; a step of digitally processing the obtained hologram pattern; a step of writing the digitized hologram pattern as a magnetized vector pattern to a spatial lighting modulator which is formed from a magneto-optical material; and a step of inputting linearly polarized light into the spatial lighting modulator and playing an image according to the digitized hologram pattern.

6 Claims, 11 Drawing Sheets

(51) Int. Cl.
*G03H 1/02* (2006.01)
*G02F 1/09* (2006.01)
*G02B 27/26* (2006.01)
*G03H 1/04* (2006.01)
*G03H 1/22* (2006.01)
*G03H 1/00* (2006.01)

(52) U.S. Cl.
CPC ......... *G03H 1/0248* (2013.01); *G03H 1/0443* (2013.01); *G03H 1/0866* (2013.01); *G03H 1/0891* (2013.01); *G02F 2203/12* (2013.01); *G03H 1/2294* (2013.01); *G03H 2001/0088* (2013.01); *G03H 2001/0268* (2013.01); *G03H 2001/269* (2013.01); *G03H 2222/31* (2013.01); *G03H 2225/30* (2013.01); *G03H 2240/25* (2013.01); *G03H 2260/35* (2013.01)

(58) Field of Classification Search
CPC .......... G03H 1/0443; G03H 1/26; G03H 1/08; G03H 1/22; G03H 2001/269; G03H 2001/0268; G03H 2001/0088; G03H 222/30; G03H 222/31; G03H 2260/35; G03H 2240/25; G03H 2225/30; G02B 27/26; G02F 1/09; G02F 2203/12
USPC ..................................... 359/9, 280
See application file for complete search history.

(56) References Cited

FOREIGN PATENT DOCUMENTS

| | | |
|---|---|---|
| JP | 04-018587 A | 1/1992 |
| JP | 06-082626 A | 3/1994 |
| JP | 2001-25664 A | 9/2001 |
| JP | 2010-8822 A | 1/2010 |
| JP | 2011-002522 A | 1/2011 |
| JP | 2011-17945 A | 1/2011 |

OTHER PUBLICATIONS

Krumme et al (MOPS, a magneto-optic-photoconductor sandwich for optical information storage. J. Appl. Phys., vol. 48, No. 1, Jan. 1977, pp. 366-368).*

Psaltis et al (Optical Image Correlation with a binary spatial light modulator, Opt, Engg, 23(6), pp. 698-704, Nov. 1984).*

English translation of International Search Report for PCT/JP2012/064095.

English translation of International Preliminary Report on Patentability for PCT/JP2012/064095.

* cited by examiner (A)

Fourier transform pattern

Pixel size : 1 μm (B)

Reproduced image: Diffraction angle ±15°

Hologram    Digital hologram

IMAGE PHOTOGRAPHY METHOD, IMAGE PHOTOGRAPHY PLAY METHOD, SPATIAL LIGHTING MODULATOR, IMAGE PLAY DEVICE, AND DIGITAL HOLOGRAM FORMING DEVICE

TECHNICAL FIELD

The present invention relates to a holographic device suitable for reproducing a video of stereoscopic images.

BACKGROUND ART

Patent Documents 1 and 2 propose techniques that use holography to reproduce a video of stereoscopic images (hereinafter, such techniques will be referred to as "electronic holography"). The techniques of the electronic holography proposed in the documents are horizontal parallax type techniques using an existing spatial light modulator and are incapable of reproducing a stereoscopic video in a full-parallax state based on the electronic holography.

Also Non-Patent Document 1 on magneto-optical hologram should be referred to.

PRIOR ART DOCUMENTS

Patent Document

[Patent Document 1] JP-A-2011-17945
[Patent Document 2] JP-A-2010-8822

Non-Patent Document

[Non-Patent Document 1] Journal of Applied physics, vol. 40, No. 3, 1969,

SUMMARY OF THE INVENTION

Problems to be Solved by the Invention

In order to reproduce the stereoscopic video, the spatial light modulator (which may hereinafter be referred to as "SLM") is required to have following innovative functions. However, no SLM is currently known to have such functions.

(1) The SIAM is required to have pixels (nano pixels) in the order of light wavelength in order to faithfully display light interference fringes (hologram) in the order of the light wavelength and in order to reproduce the stereoscopic image in a wide view angle.

(2) The SLM for the electronic holography requires quite a large number of pixels in order to avoid reduction in the display size caused by reduction in the pixel size (the SLM requires pixels several hundred thousand times larger than those of the existing SLM in order to achieve the same display size as the existing SLM). Therefore, technique for forming the SLM needs to be easy, and pixel wiring needs to be simple.

(3) The SLM is required to achieve ultrafast operation such that the above large-scale pixels are operable at field frequency compliant with video.

It is an objective of the present invention to provide a spatial light modulator that achieves at least one of the above functions (1) to (3).

Inventors of the present invention have ardently studied in order to achieve the above objective, resulting in a focus on a magneto-optical material and having reached the present invention.

The magneto-optical material is capable of controlling a polarization state of light based on a magnetization state thereof. The magnetization state of the magneto-optical material can be controlled by a very small unit. Therefore, if pixels (picture elements) can be constituted with arbitrary width, nano pixels (pixels in the order of the light wavelength) can be formed. In addition, the magnetic moment of the magneto-optical material can be easily inverted by, for example, heating the material. Thereby, it is possible to control the polarization state of the light. Accordingly, the nano pixels can be formed easily, and no wiring is required. Furthermore, when the magneto-optical material is heated, the magnetic moment of the material is instantly inverted, whereby it is possible to achieve an ultrafast operation.

In view of the above characteristics of the magneto-optical material, the inventors of the present invention have studied formation of a hologram based on interference between lights (diffracted lights) polarized by the magneto-optical material.

FIG. 1(A) illustrates a principle of a polarization state with the magneto-optical material. FIG. 1(A) shows that when a P-polarized light is incident on the material, the light is rotated according to the direction of the magnetic moment. The rotated light produces a S-polarized light that is oriented to the left in the example of the material 1A in the drawing, where the magnetic moment is directed from the back side toward the front side of the drawing. The rotated light produces a S-polarized light that is oriented to the right in the example of the material 1B in the drawing, where the magnetic moment is directed from the front side toward the back side of the drawing.

If regions having different magnetic moments are arranged in a magneto-optical material 1C as shown in FIG. 1(B), interference occurs between S-polarized lights in the outgoing light, whereby a hologram can be formed.

In the above, the S-polarized light is required to have a predetermined intensity in order to form a visually recognizable hologram.

The inventors of the present invention constructed an experimental device shown in FIG. 2 in order to investigate the intensity of the S-polarized light. A magneto-optical material 1D is made of TbFe and has the magnetic moments oriented in opposite directions for each grating of 1 μm. When a P-polarized light is incident on the magneto-optical material 1D, a reflected light (transmitted light in FIG. 1(B)) and a diffracted light (S-polarized light in FIG. 1(B)) are observed (see FIG. 3). A diffraction angle $\phi$ is 15 degrees.

FIG. 4 illustrates a relationship between a polarization angle (or polarized rotation) and diffracted light $I_1$/reflected light $I_0$ in the case of the magneto-optical material 1D. In FIG. 4, the light having the polarization angle of 90 degrees is diffracted by 15 degrees (see FIG. 1(A)), and the resulting ratio of diffracted light $I_1$/reflected light $I_0$ is 18%. In the above, the reflected light is the reflected light of non-modulated components. Thus, it is appreciated that the diffracted light having sufficient intensity can be obtained.

FIG. 5(A) is a Fourier transform pattern that is written in the magneto-optical material 1D. The Fourier transform pattern is formed as follows. Firstly, Fourier transformation of a two dimensional image of a character "A" is executed by a computer to obtain a Fourier image (hologram pattern). The Fourier image is digitized (into binary), and then each bit of the digital data is thermomagnetically written into the magneto-optical material (TbFe) as the magnetic hologram.

FIG. 5(B) illustrates an image reproduced on a screen of FIG. 2. As illustrated in FIG. 5(B), it is appreciated that the diffracted light forms the image of the character "A" and that the image has light intensity sufficient for visual recognition.

The magneto-optical hologram described in Non-Patent Document 1 will be referred to for comparison. In the magneto-optical hologram described in Non-Patent Document 1, a hologram formed by interference between the reference light and the object light is directly written in the magneto-optical material. Thus, the formed hologram is an analog pattern.

In contrast, in the present invention, a digital hologram pattern digitized in accordance with the pixels of the magneto-optical material (spatial light modulator) is obtained from the hologram pattern formed by the reference light and the object light. Then, the digital hologram pattern is written in the magneto-optical material.

When a three dimensional image is reproduced from the digital hologram pattern, a pitch of the pixels on the magneto-optical material is required to be small in order to achieve a wide view angle.

For example, a following relational expression is satisfied:

$$\phi = 2 \sin^{-1}(\lambda/2\rho),$$

where the view angle of the stereoscopic image is $\phi$, the wavelength of the incident light is $\lambda$, and the pitch of the pixels is $\rho$.

When the wavelength of the reference light is 532 nm and the pitch of the pixels is equal to or less than 1 μm, the view angle $\phi$ is approximately equal to or greater than 30 degrees. If such the wide view angle is achieved, a stereoscopic image reproduced on the stereoscopic image formation surface is full-parallax and thereby is suitable for practical use.

The above expression assumes that the incident light is perpendicularly incident on the digital hologram pattern. When the incident light is obliquely incident on the digital hologram pattern, the reference light is also obliquely incident thereon. As a result, an apparent pitch of the pixels becomes smaller in this case. In other words, interference fringes that form the hologram become finer. It does not cause any problem when the hologram is recorded in an analog manner (or recorded as a plane). In the digital hologram, however, the intensities of the interference fringes are averaged for each pixel to determine the value for each pixel, for example. Therefore, if the interference fringes are too fine, there is a possibility that the fringe pattern cannot be sufficiently reflected. Thus, from a viewpoint of forming the digital hologram, it is preferable that the incident light (i.e., the reference light) is perpendicularly incident on the pattern. Because of the above reason, the term "perpendicular" in the present specification does not mean only "strictly perpendicular," but errors of devices are tolerated.

From a viewpoint of acquiring a digital hologram for a stereoscopic video, if resolution of a device (such as a hologram camera) for digitizing the hologram decreases (or limit of pixel size decreases), some inclination of the reference light relative to the hologram forming surface (a light receiving surface of the hologram camera) is tolerated. The term "perpendicular" in the present specification includes the above some inclination (for example, equal to or less than 5 degrees, or more preferably equal to or less than 3 degrees).

Based on the above characteristics, a first aspect of the present invention is defined as follows. A method of photographing an image comprises the steps of forming a hologram pattern based on a reference light and an object light; digitizing the formed hologram pattern; and writing the digitized hologram pattern, as a pattern of a magnetization vector, into a spatial light modulator made of a magneto-optical material.

According to the image photography method of the first aspect as defined above, the hologram generated by interference between the reference light and the object light is digitized in association with the pixels, which are defined as a first region and a second region, on the magneto-optical material of the spatial light modulator. As a result, treatment (such as storage, transfer, processing) of the digital hologram pattern is facilitated. Because each value of the digital hologram pattern corresponds to a pixel of the spatial light modulator, it is possible to magnetically write or rewrite the digital hologram pattern into the magneto-optical material of the spatial light modulator easily and quickly.

In the above, when the hologram pattern is formed, it is preferable that the reference light is perpendicularly incident on the hologram forming surface. Thus, the incident light can be made to be incident perpendicularly on the digital hologram pattern when reproducing the image. As a result, the maximum view angle for the pixel size (pitch) of the digital hologram pattern can be secured. Although the reference light and the incident light have the same wavelength, the lights may have different wavelengths as long as the image can be reproduced.

If a linearly polarized incident light is incident on the digital hologram pattern of the magneto-optical material so that an outgoing light (zero-order light) is rotated by 90 degrees, a diffracted light having sufficient light intensity can be obtained. Therefore, by blocking the outgoing light with a polarizer, a visible image can be obtained using the diffracted light.

The present invention is defined as follows based on another point of view. A spatial light modulator comprises a stereoscopic image formation surface made of a magneto-optical material. The stereoscopic image formation surface has magnetic moments, axes of which are aligned in a direction perpendicular to the surface. The stereoscopic image formation surface includes a first region having the axis of the magnetic moment in a first direction and a second region having the axis of the magnetic moment in a direction opposite to the first direction. Width of the minimum unit of the first region and the second region is equal to or less than 1 μm.

In the thus defined spatial light modulator, the axes of the magnetic moments of the stereoscopic image formation surface are aligned in a certain direction. As a result, by controlling the directions of part of the magnetic moments of the stereoscopic image formation surface, it is possible to form regions (a first region, a second region) having different magnetic moment directions on the stereoscopic image formation surface. When a light is incident on the first region and the second region having the magnetic moments in the different directions, the light is diffracted in different directions depending on the regions. As a result, a hologram (light interference fringes) is formed by the first region and the second region, and interference is caused between the influenced lights to generate a stereoscopic image. In the above, the directions of the magnetic moments can be controlled by heating. In order to inhibit heat transfer to other parts, heating time is adjusted to a short time (e.g., approximately 10 ns). As a result, it is possible to invert only the magnetic moment of the heated part. According to a study by the inventors of the present invention, the heating time has been reduced to 50 ps so far.

When a pulse laser light is employed, it is possible to heat a region having width equal to or less than 1 μm on the stereoscopic image formation surface in a short period of time. Due to the above, it is possible to form the first region and the second region having the magnetic moments in the mutually different directions and having the width equal to or less than 1 μm.

If each of the first region and the second region is considered as a pixel (picture element), it is possible to form a stereoscopic image with a wide view angle. For example, a following relational expression is satisfied:

$$\phi = 2\sin^{-1}(\lambda/2\rho),$$

where the view angle of the stereoscopic image is $\phi$, wavelength of incident light is $\lambda$, and a pitch of the pixels is $\rho$.

When the wavelength of the reference light is 532 nm and the pitch of the pixels is equal to or less than 1 μm, the view angle is approximately equal to or greater than 30 degrees. If such the wide view angle is achieved, a stereoscopic image reproduced on the stereoscopic image formation surface is full-parallax and is suitable for practical use.

EMBODIMENT OF THE INVENTION

Figure 1:
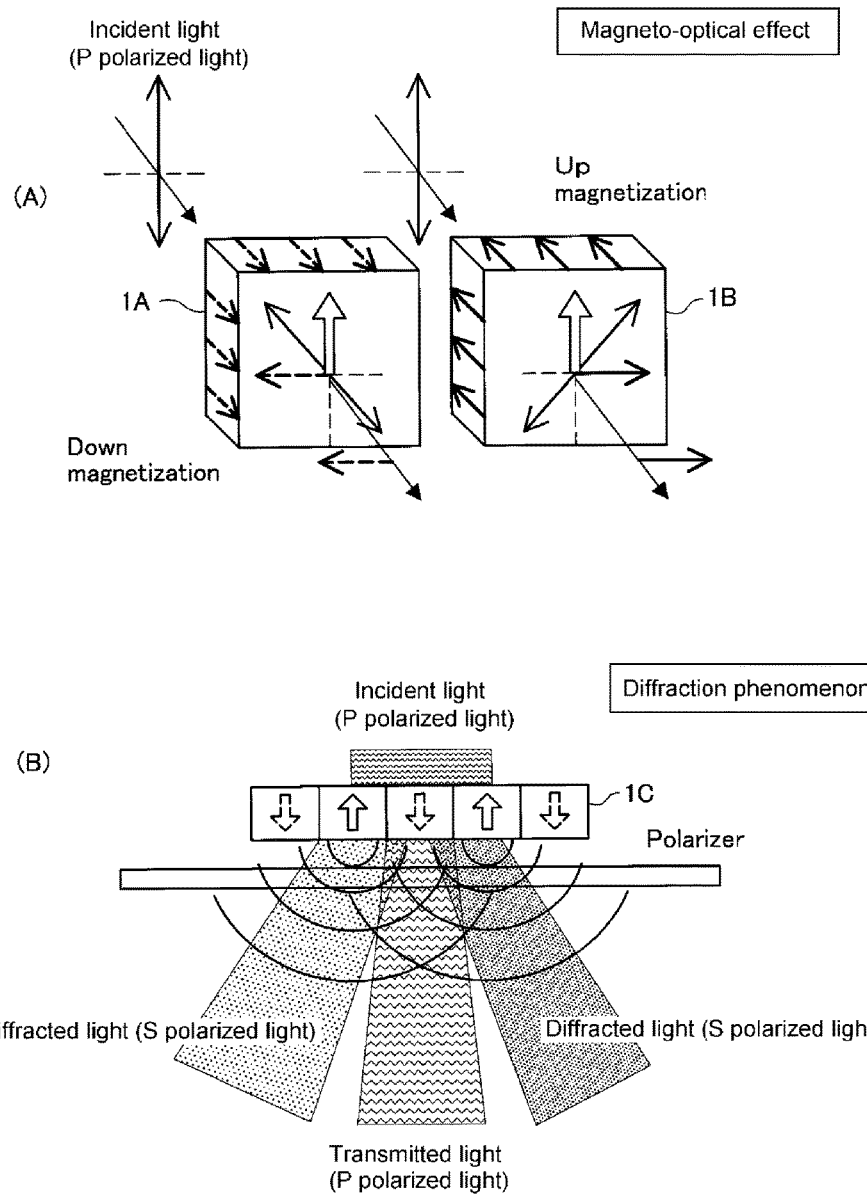
FIG. 1 is a schematic diagram for explaining a relation between a magneto-optical effect and a diffraction phenomenon.
Figure 2:
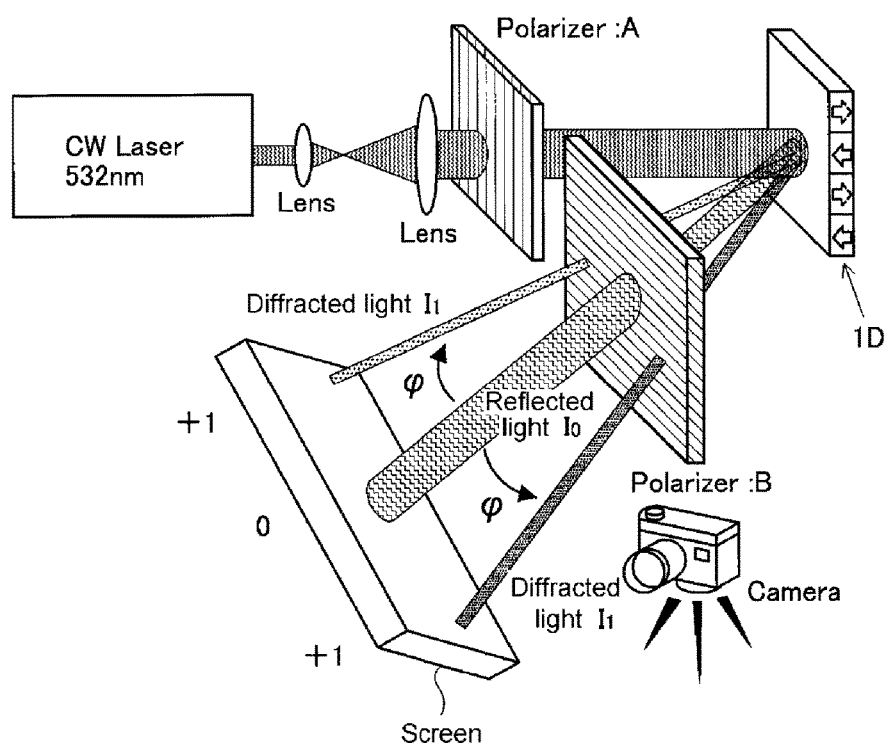
FIG. 2 illustrates a configuration of an observation device for observing a light diffraction effect by a magneto-optical material.
Figure 3:
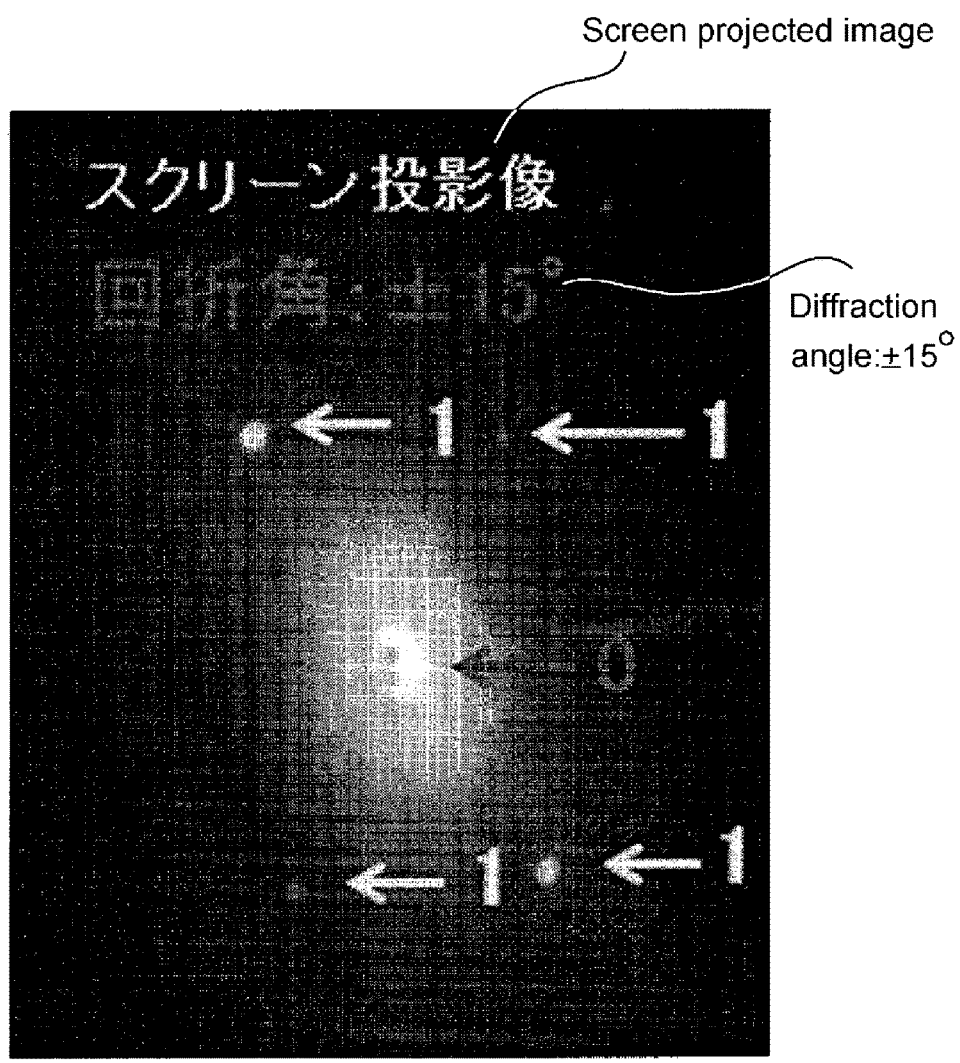
FIG. 3 illustrates an image reproduced on a screen in the observation device of FIG. 2 when the observation device employs the magneto-optical material having magnetic moments arranged in the shape of grating, where adjacent magnetic moments are oriented in different directions.
Figure 4:
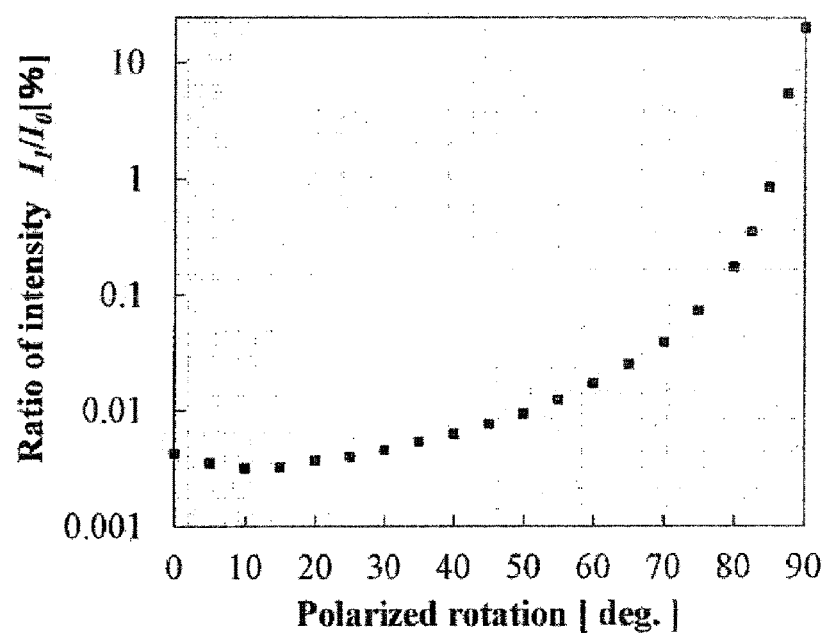
FIG. 4 illustrates a relation between a polarization angle of the incident light and diffracted light $I_1$/reflected light $I_0$ at the time when a light is incident on the magneto-optical material.

In the above, the magneto-optical material is not limited specifically as long as the light phase can be controlled by the magnetization state (or more specifically, the directions of magnetization vectors) of the material. For example, a metal magnetic material (such as TbFe, DyFe) or a transparent oxide magnetic material (such as YIG) can be used as the magneto-optical material.

The stereoscopic image formation surface is made of the above magneto-optical material. A single stereoscopic image formation surface should be preferably made of a single kind of the magneto-optical material. Alternatively, the single stereoscopic image formation surface may be made of multiple magneto-optical materials.

The stereoscopic image formation surface should be preferably a smooth surface in order to avoid light scattering or random phase variation.

The stereoscopic image formation surface is not limited to a flat surface but may be a curved surface such as a spherical surface.

On the entire stereoscopic image formation surface, the axial directions of the magnetization vectors are aligned in a certain direction, preferably in a direction perpendicular to the surface.

A protective coating should be preferably formed on the stereoscopic image formation surface. The protective coating is provided to inhibit degradation (such as oxidation) of the magneto-optical material of the stereoscopic image formation surface. In a case where the stereoscopic image formation surface exerts the Faraday effect or the Kerr effect, the protective coating multiply reflects the light between the protective coating and the stereoscopic image formation surface and amplifies the phase variation.

In order to control the magnetic moment of the stereoscopic image formation surface, its coercive force is reduced, and then the magnetic moment is inverted with the surrounding magnetic field or the external magnetic field. An example of methods for controlling the magnetic moment is heating. Only a heat amount capable of reducing the coercive force may be applied to the stereoscopic image formation surface. There is no need to raise the temperature of the magneto-optical material of the stereoscopic image formation surface to the Curie temperature. Also, heating time should be preferably the minimum time necessary for inverting the magnetic moments of a heating-target region. A long heating time is not preferable because the heat may be transferred to a region other than the heating-target region, and thereby the magnetization vectors of the accidentally heated parts may be erroneously changed.

According to a study by the inventors of the present invention, it is appreciated that it is possible to invert the magnetic moment by an irradiation time of a dozen nano seconds or so using a laser light capable of heating the magneto-optical material constituting the stereoscopic image formation surface. Therefore, it is understood that ultrafast writing is possible.

As is known from the above description, the stereoscopic image formation surface has a first region and a second region formed thereon, and the first region has a magnetic moment direction different from that of the second region. These regions may be formed in any width and shape, and may be formed continuously or discontinuously.

If a minimum unit region that serves as the first region or the second region is determined in advance, the minimum unit region serves as a pixel (picture element), and thereby a hologram can be formed. When the width of the pixel is equal to or less than 1 μm, or in other words, when the width of the minimum unit of the first region and the second region is equal to or less than 1 μm, a stereoscopic image with a view angle of approximately 30 degrees can be obtained. As a result, a full-parallax stereoscopic image can be obtained.

A lower limit of the width of the pixel is not limited particularly as far as the laser light for heating can be sufficiently condensed thereon. It is thought that the lower limit of the width may be 0.1 µm because of thermal diffusion speed and limitation of an optical system for condensing the light.

As discussed above, the first region and the second region may be formed in any shapes. In other words, the shape of the pixel is not limited to a square shape but may be another polygonal shape or a circular shape. In order to avoid influence of heat given to adjacent pixels, a small gap may be formed between the pixels.

If a spatial light modulator is formed with a thin plate 1 made of a magneto-optical material (see FIG. 6), entirety of a first surface of the thin plate can serve as a stereoscopic image formation surface 3. It is because the axial directions of all the magnetic moments of the magneto-optical material are aligned in the same direction from its nature. General technique for forming a magnetic thin film such as a sputtering method and a sol-gel method may be employed as the method of producing the thin plate 1.

FIG. 6(B) illustrates a partially enlarged plan view of the stereoscopic image formation surface. As illustrated in FIG. 6(B), the stereoscopic image formation surface 3 has circular pixels formed thereon, and each pixel serves as a first region 5 or a second region 6 depending on the direction of the magnetization vector. Even if a certain pixel is located on the same coordinate, the name of the region of the pixel inverts between the first region and the second region when the magnetization vector direction of the pixel changes.

The spatial light modulator is not limited to the thin plate shape. A spatial light modulator, in which a part of the bulk of the magneto-optical material is made into a smooth surface and the axial directions of the magnetization vectors are aligned with respect to the smooth surface, may be employed.

In a case where the spatial light modulator is formed in the thin plate shape, the thickness should be preferably determined such that the axial directions of the magnetization vectors are maintained from one surface (the stereoscopic image formation surface 3) to the other surface (back side 4) (see FIG. 6(C)). For example, when the thin-plate-shaped spatial light modulator is made of TbFe, the thickness should be preferably 100 nm in order to obtain the above characteristics. When the thus formed thin-plate-shaped spatial light modulator is employed, a laser light for controlling the directions of the magnetization vectors may be incident on any one of the front side and the back side of the thin-plate-shaped spatial light modulator 1.

Also, by making the thickness of the thin-plate-shaped spatial light modulator thin enough to allow the light to transmit therethrough, it is possible to irradiate the stereoscopic image formation surface 3 with the reference light for forming the stereoscopic image from the back side 4. In order to obtain the above characteristics, the thickness should be preferably equal to or less than 100 nm.

A hologram (light interference fringes) can be formed on the stereoscopic image formation surface 3 of the above spatial light modulator by a following method.

(Predefined Hologram)

When the stereoscopic image formation surface 3 is irradiated with an energy beam that is condensed to width equal to or smaller than the pixel width and that is capable of changing the directions of the magnetic moments of the magneto-optical material, the directions of the magnetic moments are inverted at the part irradiated with the energy beam. A predefined hologram is digitized, and whether to perform the irradiation of the energy beam or not is decided based on the value of each pixel.

A laser beam may be employed as the energy beam, for example. In a case of the thin-plate-shaped spatial light modulator, the energy beam may be incident on the back side 4 of the modulator. Further explanation will be given below using the laser beam as a representative example of the energy beam.

In order to form the hologram, which uses the difference in the directions of the magnetization vectors, on the stereoscopic image formation surface 3, while the stereoscopic image formation surface 3 is directly scanned with the laser beam, which has width corresponding to the pixels, the laser beam may be turned off at the unwanted pixels. However, adjustment of a scanning device is troublesome in order to accurately scan the pixels equal to or less than 1 µm with the laser beam.

Therefore, the inventors examined the use of an optical element having pixels (general spatial light modulator) such as DMD (Digital Micromirror Device) to transfer the pixel information of the optical element to the entirety of the stereoscopic image formation surface. More specifically, the pixels of the optical element are associated with the pixels of the stereoscopic image formation surface in advance. Then, each pixel of the optical element is irradiated with the laser beam, and the reflected laser beam is supplied to the stereoscopic image formation surface. However, width of the pixel of the existing optical element is equal to or greater than 10 µm. Therefore, the direction of the magnetization vector cannot be controlled for each desired pixel of the stereoscopic image formation surface even if the laser beam, which is reflected by the pixel of the existing optical element, is irradiated as it is. That is, it is impossible to transfer the information of the pixels of the optical element to the element of the stereoscopic image formation surface. Therefore, in addition to irradiating each pixel of the optical element with the laser beam, a lens should be preferably interposed between the optical element and the stereoscopic image formation surface to reduce the diameter of the laser beam reflected by each pixel of the optical element. Then, each pixel of the stereoscopic image formation surface may be irradiated with the beam.

The width of the laser beam for irradiating each pixel of the optical element may be alternatively preset equal to or less than 1 µm.

In the above, the laser beam for irradiating the optical element may have beam width that covers the entire reflective surface of the optical element.

(Formation of Hologram of Arbitrary Object)

Firstly, an object light from an object is caused to interfere with a reference light to form a hologram, which may be referred to as a "mother hologram" hereinafter. A subsequent process may be the same as the above. More specifically, the mother hologram is digitized, and the resulting data is translated into each pixel of the optical element such that the mother hologram is transferred to the hologram on the stereoscopic image formation surface.

When a video serves as the object, the above process needs to be repeated for each of the single frames of the video. Thus, a hologram for every single frame is formed on the stereoscopic image formation surface. By making the reference light be incident on the stereoscopic image formation surface, it is possible to reproduce a stereoscopic video corresponding to the video, which serves as the object.

Next, reproduction of the hologram will be described. When a linearly polarized reference light is incident on the stereoscopic image formation surface 3 having a hologram formed thereon, an outgoing light is diffracted based on the directions of the magnetization vectors of the stereoscopic image formation surface 3 such that a stereoscopic image is formed. In the above, it is difficult to modulate the entire incident reference light. Therefore, a polarizer should be preferably provided on a side of the stereoscopic image formation surface 3, on which the stereoscopic image is formed, in order to eliminate the influence of the reference light. A polarizer of $\lambda/2$ may be used.

The linearly polarized reference light is obtained by interposing the polarizer between a light source and the spatial light modulator or by employing a polarized light source using a liquid crystal or the like.

Figure 6:
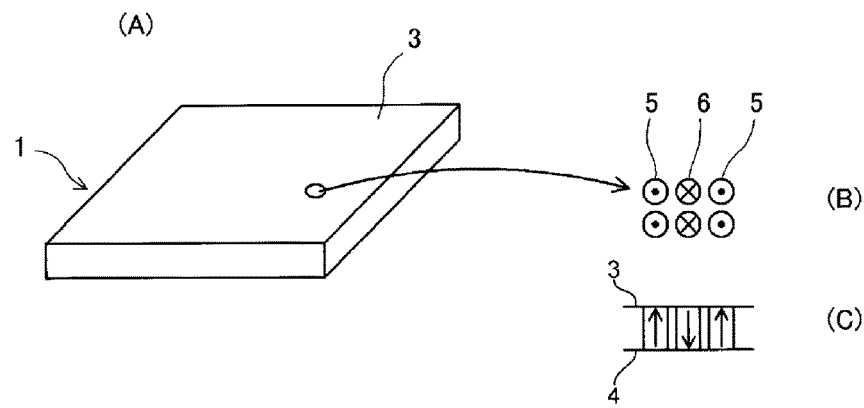
FIG. 6 illustrates a structure of a spatial light modulator according to an embodiment of the present invention.
Figure 7:
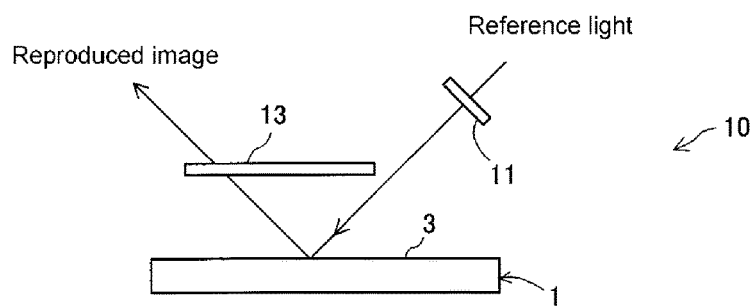
FIG. 7 illustrates a configuration of a holographic device according to the embodiment of the present invention.

An example of a holographic device 10 that uses the spatial light modulator in FIG. 6 will be described below. FIG. 7 illustrates a basic configuration of the holographic device 10. Note that components that provide effects similar to those of the components described in FIG. 6 will be designated with the same numerals, and the description of the components will be omitted. The spatial light modulator 1 may employ a perpendicular magnetization film made of a metal ferromagnetic thin film (film thickness: 100 nm) of amorphous TbFe added with rare earth elements. The above film may be sandwiched between Bragg mirrors to form a microcavity-type magnetophotonic crystal structure.

The hologram is thermomagnetically written into the stereoscopic image formation surface 3 using the laser beam. The existing DMD (1024×768 pixels) is irradiated with a pulse laser beam of several ns, and a page modulated light from the DMD is reduced to a pixel pitch of 1 μm using a lens. Thus, it is possible to control the direction of the magnetization vector by the pixel pitch 1 μm of the stereoscopic image formation surface 3. The time required for the above thermomagnetic writing is several tens of nano seconds by the laser pulse width.

A first polarizer 11 makes a reference light into a linearly polarized light, and the polarized reference light is incident on the stereoscopic image formation surface 3. The phase of the light diffracted by the stereoscopic image formation surface 3 differs depending on the hologram, which is based on the directions of the magnetization vectors formed on the stereoscopic image formation surface 3. Therefore, the phase variation reproduces an image (stereoscopic image). In the above case, because the pixel width of the stereoscopic image formation surface 3 is equal to or less than 1 μm, the view angle is approximately 30 degrees, and thereby a full-parallax stereoscopic image is obtained. In order to eliminate the influence of the reference light (the reflected light), a second polarizer 13 (such as a $\lambda/2$ polarizer) should be preferably provided on an observation surface side. The second polarizer 13 has a relation of 90 degrees with respect to the first polarizer 11. In the above case, if a laser light of wavelength 532 nm is used as the reference light, the view angle is approximately 30 degrees.

Figure 8:
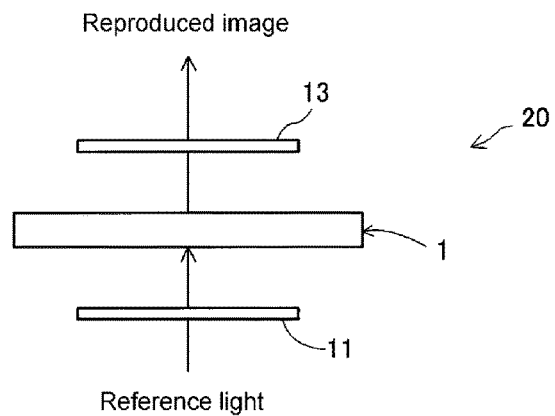
FIG. 8 illustrates a configuration of a holographic device according to another embodiment of the present invention.

FIG. 8 illustrates a holographic device 20 according to another embodiment. In FIG. 8, components that provide effects similar to those of the components described in FIG. 7 will be designated with the same numerals, and the description of the components will be omitted.

In the holographic device 20, a thin-plate-shaped spatial light modulator 1 is translucent. The reference light is incident on the back side of the modulator 1 and is caused to transmit through the stereoscopic image formation surface 3 having the hologram formed thereon.

The above configuration enables linear arrangement of the components (a reference light source, the first polarizer 11, the spatial light modulator 1, and the second polarizer 13) of the holographic device 20, whereby enabling reduction of the size of the device 20.

Figure 9:
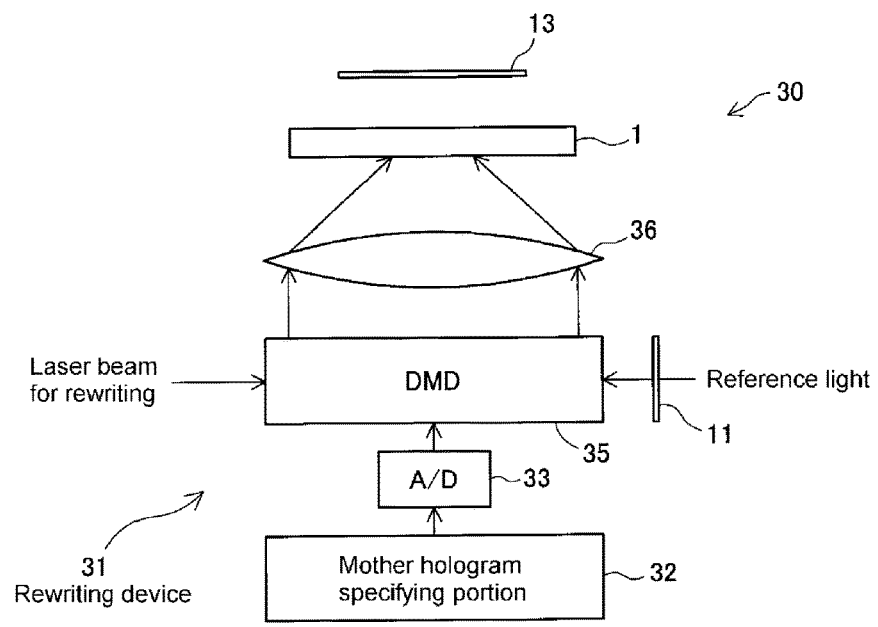
FIG. 9 illustrates a configuration of a holographic device according to yet another embodiment of the present invention.

FIG. 9 illustrates a holographic device 30 according to still another embodiment. In FIG. 9, components that provide effects similar to those of the components described in FIG. 8 will be designated with the same numerals, and the description of the components will be omitted.

The holographic device 30 includes a device 31 that is capable of rewriting the hologram of the spatial light modulator 1. The rewriting device 31 includes a mother hologram specifying portion 32, an AD converting portion 33, a general spatial light modulator such as a DMD 35, and a lens unit 36. The mother hologram specified by the mother hologram specifying portion 32 is converted by the AD converting portion 33 into values for pixels of the DMD 35. In other words, the mother hologram is transferred to the DMD 35. The DMD 35 is irradiated with a laser beam for rewriting, and the laser beam is reflected by the DMD 35. Then, the lens unit 36 condenses the reflected beam and irradiates the spatial light modulator 1 with the beam. Thus, the pattern of the mother hologram is transferred as a pattern of the directions of the magnetization vectors of the spatial light modulator 1.

It is assumed that the rewriting laser beam has sufficient energy for inverting the magnetization vectors of the magneto-optical material of the spatial light modulator 1. As illustrated in FIG. 6(C), it is possible to invert the directions of the magnetization vectors appearing on the stereoscopic image formation surface 3 also by irradiating the back side of the spatial light modulator 1 with the laser beam.

The DMD 35 has the pixel width equal to or greater than 10 μm. Therefore, the laser beam is condensed with the lens unit 36 to the pixel width of 1 μm. Thus, a wide view angle can be obtained, and thereby the full-parallax stereoscopic image can be obtained at the stereoscopic image formation surface 3.

In this example, the DMD 35 and the lens unit 36 are used also as the passage for the reference light, thereby achieving common use of the components.

In the above example, the hologram is formed at a specific region of the spatial light modulator 1, and the specific region serves as the stereoscopic image formation surface 3. Alternatively, if the spatial light modulator 1 has a large available area, scanning with the light after the lens unit 36 may be performed and the stereoscopic image formation surfaces 3 may be formed at multiple parts of the spatial light modulator 1. In other words, the thin-plate-shaped spatial light modulator 1 may have multiple stereoscopic image formation surfaces 3 to serve as an album of holograms.

Figure 10:
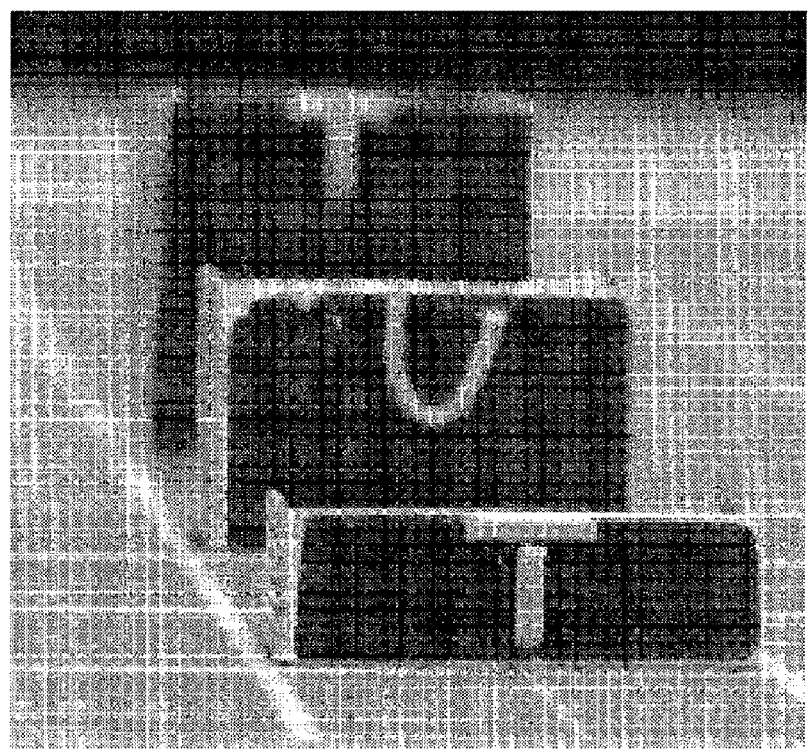
FIG. 10 illustrates a photographed object according to an example embodiment of the present invention.

FIGS. 10 to 14 illustrate example embodiments of the present invention. FIG. 10 illustrates objects to be photographed for a three dimensional hologram. In this example, three boxes of different heights are arranged as the objects to be photographed, each containing a character, in the order of T, U, T from the foreground.

Figure 11:
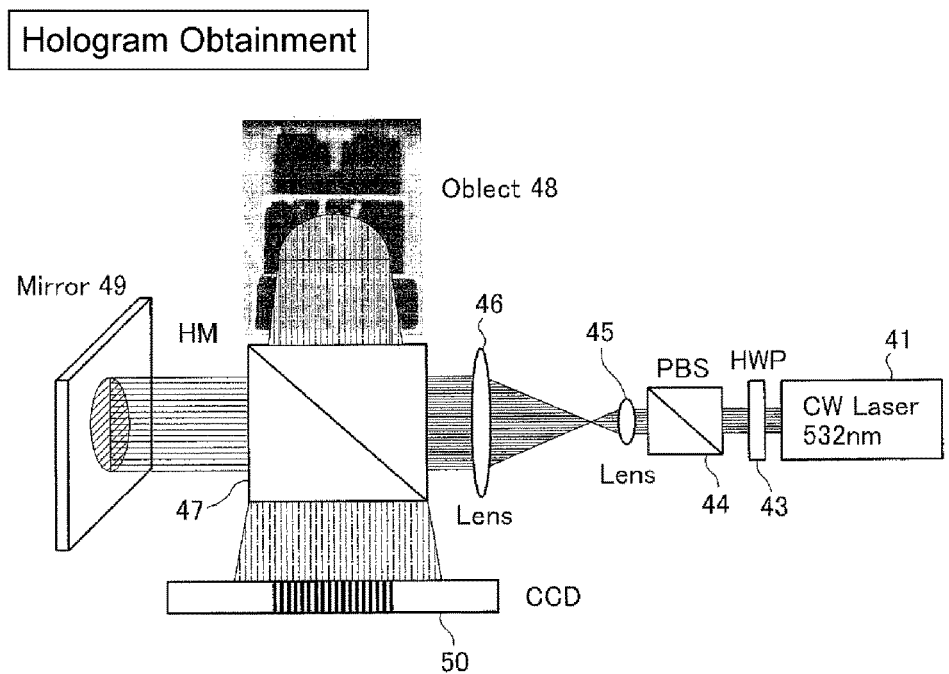
FIG. 11 illustrates a configuration of a hologram obtaining device of the example embodiment of the present invention.
Figure 12:
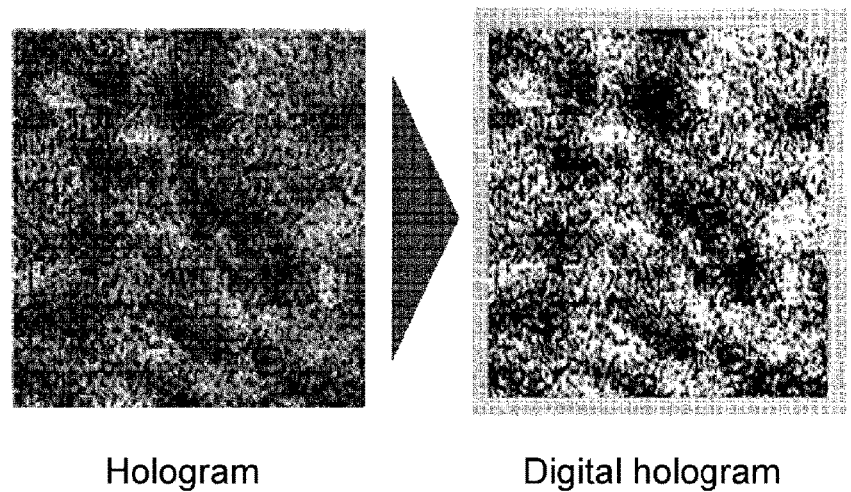
FIG. 12 illustrates a hologram obtained by the device shown in FIG. 11.

FIG. 11 illustrates a hologram obtaining device. In the device, a CW laser of 532 nm is emitted from a CW laser device 41, and HWP ($\lambda/2$ plate) 43 and a polarizer (PBS) 44 generate a linearly polarized light from the laser light. Then, lenses 45, 46 collimate the light such that the light is incident on a half mirror 47. The incident light reflected by the half mirror 47 is reflected by a photographed object 48 and becomes an object light for forming a hologram. In contrast, the incident light that transmits through the half mirror 47 is reflected by a mirror 49 and becomes a reference light. The object light and the reference light form the hologram (see the hologram in FIG. 12) on a light receiving element (CCD), and the hologram pattern is photographed by the CCD and converted into binary (see the digital hologram in FIG. 12).

In the above, by assigning one or more pixels of the light receiving element to a unit pixel of the spatial light modulator, output from the light receiving element can correspond to the digital hologram pattern. Alternatively, a hologram pattern (analog) may be temporarily fixed on a photosensitive material (such as a photographic film) instead of the light receiving element, and the fixed hologram pattern may be photographed by a CCD camera to obtain the digital hologram pattern.

The digital hologram serves as the mother hologram. In this way, information of the digitized mother hologram is written into a magneto-optical material via, for example, the DMD (see FIG. 9).

Figure 5:
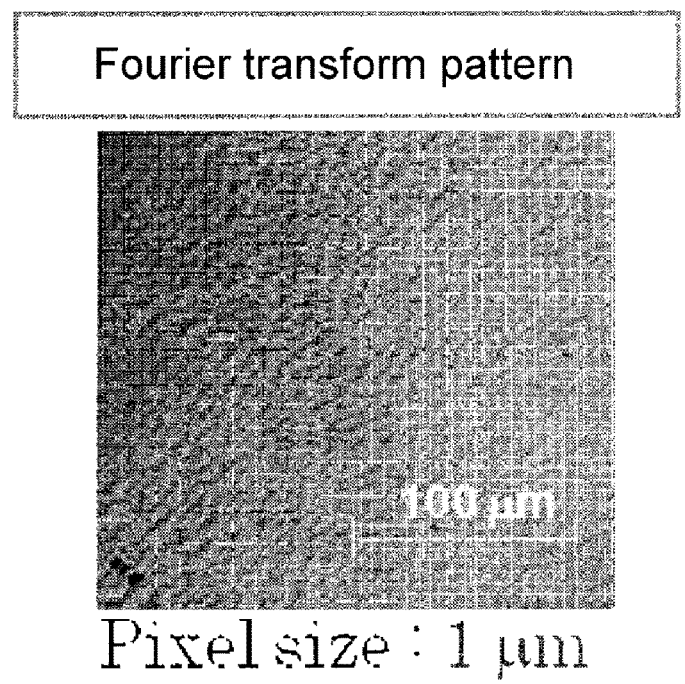
FIG. 5(A) is an enlarged plan view of the magneto-optical material having a magnetic moment pattern (digital hologram) that corresponds to a two dimensional Fourier image "A"
FIG. 5(B) illustrates a reproduced image of the two dimensional Fourier image of the magneto-optical material.
Figure 5:
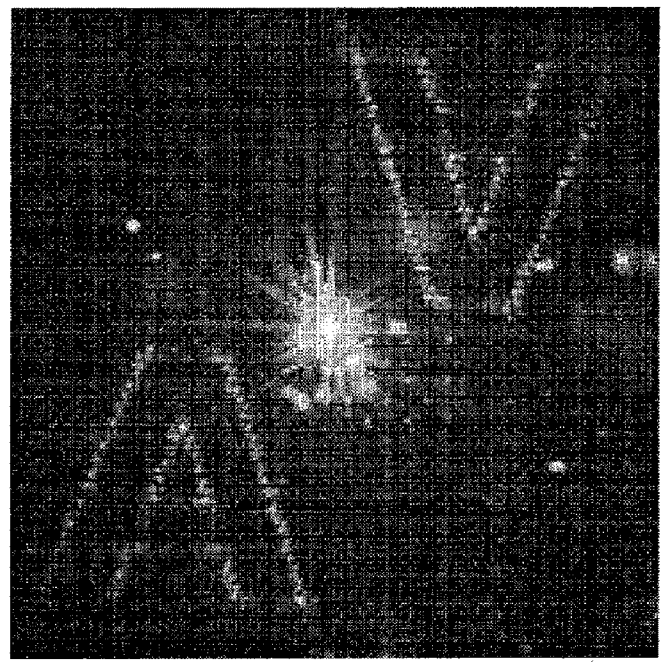
Figure 13:
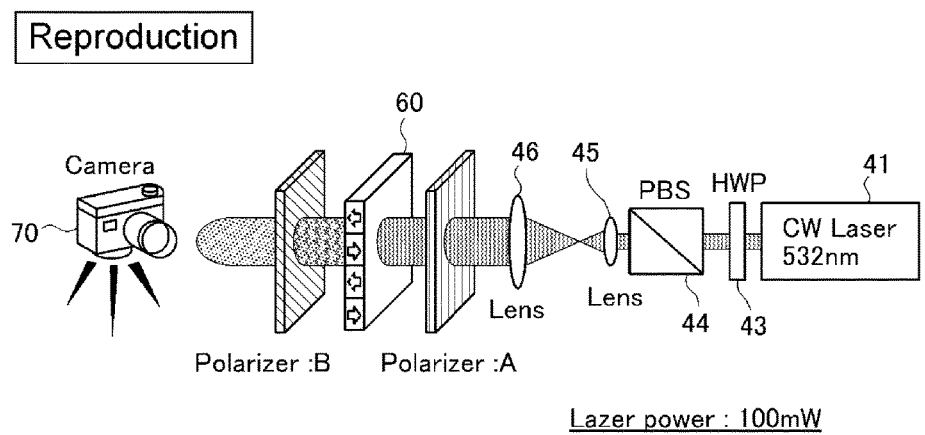
FIG. 13 illustrates a configuration of a hologram reproducing device of the example embodiment of the present invention.

A magneto-optical material (spatial light modulator) 60, in which the magnetization pattern is written as above, is placed on a reproducing device shown in FIG. 13. In FIG. 13, components similar to those in FIG. 11 will be designated with the same numerals, and the description of the components will be omitted. In FIG. 13, a polarizer B blocks a zero-order component of the incident light and allows only the light, which is diffracted by the magneto-optical material 60, to transmit therethrough. As illustrated in FIG. 5(B), a visible image can be reproduced with the diffracted light.

In the photographing device in FIG. 10 used in the present example embodiment, the object light and the reference light are set parallel to each other and are perpendicularly incident on the light receiving surface of the light receiving element to form the hologram there. By arranging the reference light in parallel to the object light in this way, the device for obtaining the hologram can be simplified.

Furthermore, the photographing device in FIG. 10 digitizes the obtained hologram pattern via the device such as the CCD. If the digitized hologram pattern is written into the magneto-optical material in association with pixels of the CCD in this way, the reproducing device can reproduce the image by simply irradiating the magneto-optical material with the reference light. In this point, it is possible to also simplify the reproducing device and to quickly reproduce the images.

Figure 14:
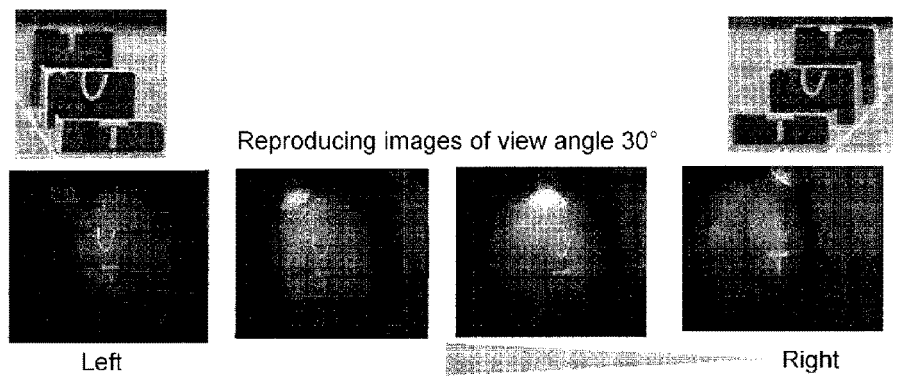
FIG. 14 illustrates pictures, which are taken at different angles, of the stereoscopic image reproduced by the hologram reproducing device shown in FIG. 13.

FIG. 14 illustrates the thus obtained images. Pictures taken while moving a position of a camera 70 in FIG. 13 in the transverse direction are arranged according to the positions of the camera 70. Actual images of the photographed object are shown on top of the pictures. In FIG. 14, when the picture on a left end is compared with the picture on a right end, it is understood that the position of the character T positioned below the character U changes transversely. Therefore, it is appreciated that the reproducing device in FIG. 13 reproduces the stereoscopic image.

In the example of the two dimensional hologram (see FIG. 5), it is confirmed that a two dimensional image is reproduced also when the wavelength of the incident light is changed to 440 nm, 532 nm, 600 nm, and 730 nm. More specifically, the image can be reproduced in the entire visible light range, which implies the possibility of reproducing a full-color stereoscopic image, and furthermore of reproducing a full-color video.

In this way, the present invention is not limited to the above description of the embodiments and the example embodiments of the present invention. The present invention includes various modifications that do not depart from the scope of claims and that could be easily thought of by those skilled in the art.

DESCRIPTION OF THE NUMERALS

1, 1A, 1B, 1C, 1D, 60 Spatial light modulator
3 Stereoscopic image formation surface
5 First region
6 Second region
10, 20, 30 Holographic device
11, 13 Polarizer
31 Rewriting device
32 Mother hologram specifying portion
33 AD converting portion
35 DMD
36 Lens unit

The invention claimed is:

1. A digital hologram-forming device, wherein a hologram represents stereoscopic images with full-parallax, the device comprising:
   a first spatial light modulator, comprising a stereoscopic image formation surface provided by a magneto-optical material,
      wherein the stereoscopic image formation surface has magnetic moments aligned perpendicularly to the surface,
      wherein the stereoscopic image formation surface includes a first region having a first magnetic moment pointing in a first direction and a second region having a second magnetic moment pointing in a second direction opposite to the first direction,
      wherein minimum widths of the first region and the second region are equal to or less than 1 µm; and
      wherein the first spatial light modulator is configured to modulate light incident thereon via a thermomagnetic effect, caused in said magneto-optical material by illuminating said magneto-optical material with a light beam; and
   a magnetic moment inverting device configured to supply heat to at least portions of the first region and the second region to invert magnetic moments of the stereoscopic image formation surface at the at least portions supplied with the heat, wherein
      the magnetic moment inverting device is configured to operate as a second spatial light modulator to reflect the light beam carrying the heat to form a reflected light beam incident on the first spatial light modulator.

2. The digital hologram forming device according to claim 1 further comprising:
   a polarizer that faces the stereoscopic image formation surface of the spatial light modulator.

3. A digital hologram forming device according to claim 1, wherein:
   the first spatial light modulator is formed as a translucent sheet of said magneto-optical material having first and second surfaces,
   the stereoscopic image formation surface is the first surface, and
   each of the first and second magnetic moments are maintained at any point between the first and second surfaces;
and
   the magnetic moment inverting device is configured to impinge the reflected light beam to the second surface, to supply the heat to the second surface of the first spatial light modulator to reverse first and second magnetic moments in the first region and the second region of the first surface.

4. A digital hologram forming device comprising:
a first spatial light modulator having a stereoscopic image formation surface provided by a magneto-optical material,
  wherein the stereoscopic image formation surface has magnetic moments, axes of which are aligned in a direction perpendicular to the surface,
  wherein the stereoscopic image formation surface includes a first region having a first magnetic moment aligned in a first direction and a second region having a second magnetic moment aligned in a direction opposite to the first direction, and
  wherein minimum widths of the first region and the second region are equal to or less than 1 µm; and
  wherein the first spatial light modulator is configured to modulate light incident thereon via a thermomagnetic effect, caused in said magneto-optical material by illuminating said magneto-optical material with a light beam;
a magnetic moment inverting device configured to supply heat to the stereoscopic image formation surface to at least portions of the first region and the second region to invert magnetic moments of the stereoscopic image formation surface at the at least portions supplied with the heat, wherein
  the magnetic moment inverting device is configured to operate as a second spatial light modulator to reflect the light beam carrying the heat to form a reflected light beam incident on the first spatial light modulator.

5. A digital hologram-forming device comprising:
a first spatial light modulator (SLM) including a layer of magneto-optical (MO) material, said layer being structured to define a plurality of first and second regions sized to be sub-micron in dimensions,
  wherein the first and second regions are respectively characterized by first and second magnetic momenta that point in opposite directions and that are substantially perpendicular to a surface of the layer, and
  wherein said first SLM is structured to have the first and second magnetic momenta changed via a thermomagnetic effect, caused in said magneto-optical material by illuminating said magneto-optical material with an energy beam;
a second SLM in radiative communication with the first SLM, the second SLM configured
  to reflect the energy beam directed thereto to form a reflected energy beam, and
  to deliver the reflected energy beam onto an area within limits of a first region or a second region from, said first and second regions, to produce results of the thermomagnetic effect in said layer.

6. A device according to claim 5,
wherein the first SLM is configured as an optically-translucent sheet of material,
wherein the first and second magnetic momenta are maintained throughout a thickness of the sheet, and
wherein said first SLM is structured to have the first and second magnetic momenta changes due to heat carried in said reflected energy beam and delivered, respectively, to the first and second regions.

* * * * *